Apr. 17, 1923.
E. N. LIGHTFOOT
1,451,880
ELECTRIC HEATING APPLIANCE
Filed Feb. 28, 1921   2 Sheets-Sheet 1
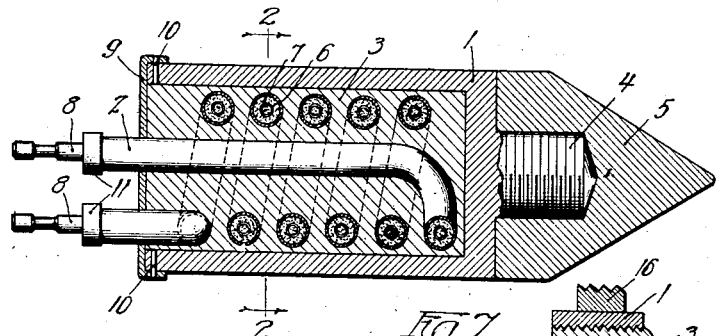
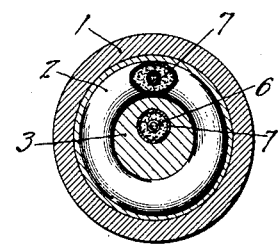
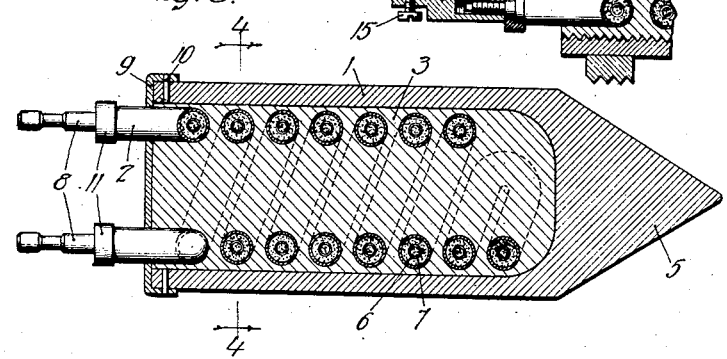
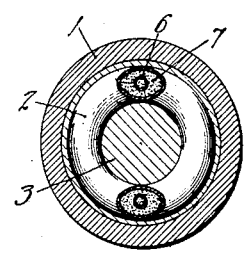
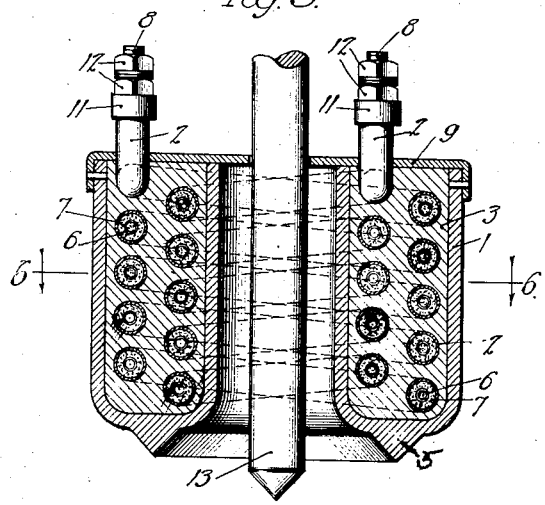
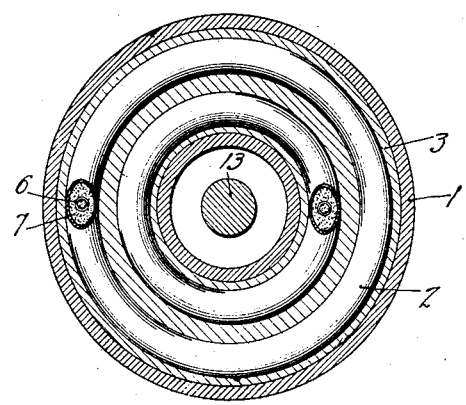
Inventor:
Edwin N. Lightfoot
By Edwin B. H. Towes Jr
Atty.

Apr. 17, 1923.    1,451,880
E. N. LIGHTFOOT
ELECTRIC HEATING APPLIANCE
Filed Feb. 28, 1921    2 Sheets-Sheet 2
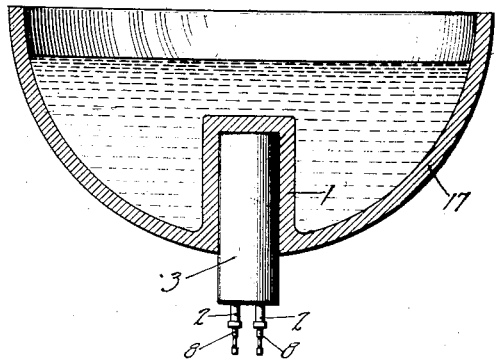
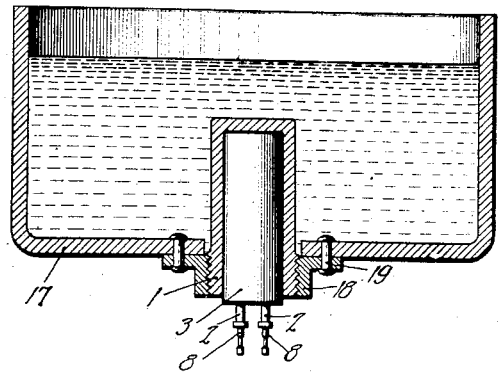
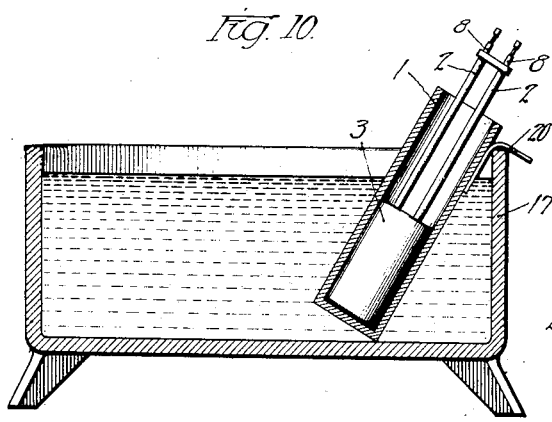
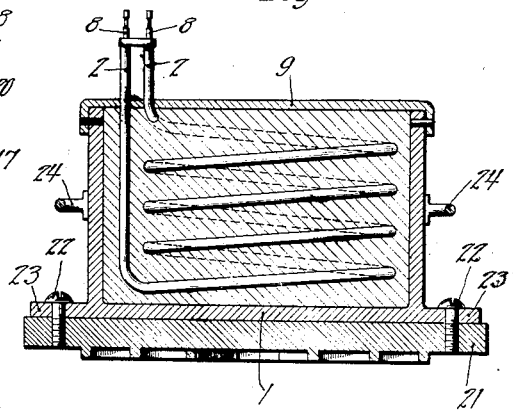
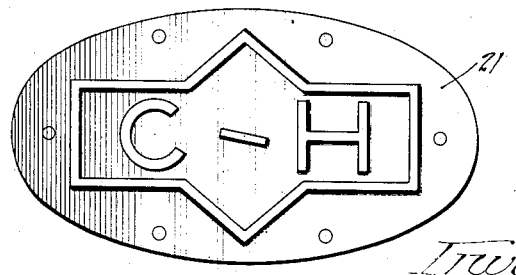
Inventor
Edwin N. Lightfoot
By Edwin B. H. Toewer Jr.
Atty.

Patented Apr. 17, 1923.

1,451,880

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

ELECTRIC HEATING APPLIANCE.

Application filed February 28, 1921. Serial No. 448,501.

*To all whom it may concern:*

Be it known that I, EDWIN N. LIGHTFOOT, a citizen of the United States, residing at New York, in the county of Bronx and State of New York, have invented new and useful Improvements in Electric Heating Appliances, of which the following is a specification.

This invention relates to an electric heating appliance.

The electric heating appliance to which this invention particularly applies comprises, in general, an elongated electric heater arranged within a casing and embedded in metal contained therein.

An object of this invention is to provide an efficient and durable electric heating appliance, capable of being worked at high temperatures in the presence of acids without undue corrosion therefrom and having the following advantages:

It may be readily and economically manufactured.

It is thoroughly protected, resulting in long life.

The electric heater may be readily removed from the appliance.

Other objects and advantages will hereinafter appear.

The views of the drawings are:

Fig 1 is a central longitudinal section through an electric soldering iron having the electric heater arranged in a single helix.

Fig. 2 is a transverse section on line 2—2 of Fig. 1.

Fig. 3 is a central longitudinal section through an electric soldering iron having the electric heater arranged in a double helix.

Fig. 4 is a transverse section on line 4—4 of Fig. 3.

Fig. 5 is a central vertical section through an electric can capping iron.

Fig. 6 is a transverse section on line 6—6 of Fig. 5.

Fig. 7 is a section through an electric heating appliance adapted for insertion in the wall of a container to be heated.

Fig. 8 is a central vertical section through an electric crucible or vat provided with an integral pocket for receiving the cast-in electric heater.

Fig. 9 is a central vertical section through an electric crucible or vat provided with a removable pocket for receiving the cast-in electric heater.

Fig. 10 is a section through a portable immersion electric heating appliance.

Fig. 11 is a central vertical section through an electric branding iron.

Fig. 12 is a bottom plan of the electric branding iron.

Figs. 1 and 2 will first be described.

The electric soldering iron comprises a shell or casing 1 containing an elongated electric heater 2, embedded in a metal core 3 filling the casing.

The shell or casing 1 is open at one end and is provided at the other with a threaded shank 4 for receiving a removable soldering tip 5.

The shell or casing is made of non-corrodible and rust-resisting material having a high melting point. Monel metal having these properties has been found to be satisfactory.

The electric heater 2 may be of the type disclosed in Lightfoot Patent 1,359,400 of November 16, 1920. This electric heater has an elongated tubular jacket having a helical resistor 6 arranged therein and insulated therefrom by compacted granular insulation 7, and plug terminals 8 rigidly fastened to the jacket and connected to the resistor.

The electric heater 2 may be bent into any desired form. It is here formed into a single helix, one end of the heater passing through the helix, so as to arrange both terminals 8 at one end of the helix and beyond and near the open end of the casing 1.

The electric heater 2 is embedded in metal core 3 which fills the casing 1 and is held thereby in spaced relation to the casing. The heater jacket should be of metal having a higher melting point than that of the metal core in which it is embedded, so as to prevent melting the jacket when the same is surrounded by molten core metal.

The core 3 is made of good heat conducting material such, for example, as brass, bronze, copper, aluminum, or type metal.

Thus, for soldering irons or other electric heating appliances working at high temperatures, a copper core having a relatively high melting point may be employed.

An aluminum core may be used when the heating appliance is to be worked at relatively low temperatures or what it is permissible for the core metal to be in a molten or plastic condition while the appliance is at or near working temperature.

Aluminum being of good heat conductivity and having a low melting point is highly satisfactory as it is easily and quickly melted by a simple blow torch. Consequently, if an electric heater of an appliance should be damaged, the core metal may be readily melted and the damaged heater replaced by another.

The open end of the casing 1 may be covered by a cap 9 secured to the casing by pins 10 or other means.

The use of the cap 9 reduces the oxidation and deterioration of the core metal and prevents the escape thereof should the core metal melt at working temperatures of the appliance.

The electric heating appliance may be assembled in several different ways.

The electric heater 2, after being bent into the desired form, may be positioned in the casing 1 and molten core metal poured into the casing. The core metal is then allowed to cool and harden.

Or the electric heater arranged in the desired form may be positioned in a temporary mold of the proper shape and the core metal poured therein. After being allowed to cool, the core with the heater cast or embedded therein may be inserted in the casing as by forcing or driving the same therein, or the casing may be shrunk on the core.

It is desirable that the core fit tightly in the casing so as to reduce the temperature gradient from the heater jacket to the casing.

The cap 9 having openings for the heater is then placed on the casing and fastened thereto. The insulating bushings 11 may then be screwed onto the plug terminals.

Thus there is provided an efficient and durable electric heating appliance, capable of being worked at high temperatures in the presence of acids, in which appliance are combined the high heat conducting qualities of the core metal and the non-corrodible and rust-resisting qualities of the shell or casing therefor. The shell or casing, therefore, serves to protect the high heat-conducting core metal against the destructive acids or vapors therefrom which would otherwise attack and damage the same.

Figs. 3 and 4 show an electric soldering iron in which the heater is bent into a double helix, and the soldering tip of the iron is integral with the casing 1.

Figs. 5 and 6 show an electric can capping iron having an annular casing 1, having a soldering tip 5 integral with the casing. The heater 2 is formed into concentric helices cast into the annular core 3 filling the casing.

The plug terminals 8 are threaded to receive nuts 12 and washers by which connection may be made to the terminals.

The cap 9 is provided with a central opening through which extends a plunger 13 which holds the can cap in place while the same is being soldered.

Fig. 7 shows a heating appliance arranged so as to be received within an opening in the wall of a chamber to be heated.

The casing 1 of this heating appliance is internally threaded for receiving the threaded core 3 in which the heater is embedded.

The plug terminals 8 of the heater are provided with extensions 14 threaded thereon and carrying terminal screws 15 by which connections may be made thereto.

An externally threaded collar or ring 16, shrunk or otherwise rigidly fastened to the casing 1 provides means by which the heating appliance may be secured within a threaded opening in the wall of the chamber to be heated. Thus the appliance is supported by the wall of the chamber.

Fig. 8 shows the heating appliances associated with a crucible or vat 17 containing the liquid to be heated.

The casing 1 of the heating appliance is formed integrally therewith and extending into the same.

Fig. 9 shows a crucible or vat equipped with a heating appliance which is removable therefrom.

The heating appliance is inserted through an opening in the bottom of the crucible.

A flanged internally threaded ring 18, registering with the opening, is rigidly fastened to the crucible by rivets 19 or other means.

The casing 1 of the heating appliance is externally threaded near its open end and screwed into the threaded ring 18 so as to be held in proper position thereby.

The core of the heating appliances of Figs. 7 to 9 should be made of metal which will remain solid at working temperatures of the heating appliance.

Fig. 10 shows the heating appliance immersed in a vat or crucible.

The heating appliance may rest on the bottom of the crucible, while a hook 20 fastened to the casing of the appliance prevents it from being completely immersed in the liquid contained therein.

Figs. 11 and 12 show an electric branding iron having a removable branding plate 21 held firmly against the bottom of the casing 1 by screws 22 passing through lugs or projections 23 on the casing.

Other means may, of course, be used for fastening the branding plate to the casing.

In order that the branding iron may easily be moved, handles 24 are provided on the casing.

The invention claimed is:

1. An electric heating appliance having, in combination, a non-corrodible, rust-resisting casing, a high heat-conducting metal core within the casing, and an electric heater embedded in the core and provided with a tubular metal jacket enclosing an insulated resistor.

2. An electric heating appliance comprising an electric heater having a tubular jacket enclosing an insulated resistor, and high heat-conducting material in contact with and surrounding the heater jacket and surfaced with substantially non-corrodible material having a high melting point, the jacket being composed of material having a higher melting point than the surrounding material in contact therewith.

3. An electric heating appliance comprising an electric heater having a metal jacket enclosing an insulated resistor, and high heat-conducting metal in contact with and surrounding the heater jacket and surfaced with substantially non-corrodible metal having a high melting point.

4. An electric heating appliance comprising an electric heater having a tubular jacket enclosing an insulated resistor, high heat-conducting metal within which the electric heater is embedded, and a Monel metal casing for the embedded electric heater.

5. An electric heating appliance having, in combination, an electric heater provided with a tubular metal jacket enclosing an insulated resistor, lower melting point core metal in which the electric heater is embedded, and a substantially non-corrosive casing tightly embracing the embedded electric heater.

6. An electric heating appliance comprising a cup-shaped substantially non-corrodible casing, a high heat-conducting metal core within the casing, and an electric heater having a tubular metal jacket enclosing an insulated resistor and embedded in the core and projecting from the open end of the casing.

7. An electric heating appliance comprising a cup-shaped substantially non-corrodible casing, a high heat-conducting metal core within the casing, an electric heater having a tubular metal jacket enclosing an insulated resistor and embedded in the core and projecting from the open end of the casing, and terminals for the heating appliance rigidly fastened to the heater jacket.

8. An electric heating appliance comprising a cup-shaped substantially non-corrodible casing, a high heat-conducting metal core within the casing, a cover for the open end of the casing, and an electric heater having a tubular metal jacket enclosing an insulated resistor and embedded in the core and projecting through the cover.

9. An electric heating appliance comprising a cup-shaped substantially non-corrodible casing, a high heat-conducting metal core within the casing, a cover for the open end of the casing, an electric heater having a tubular metal jacket enclosing an insulated resistor and embedded in the core and projecting through the cover, and terminals for the heating appliance rigidly fastened to the heater jacket.

10. An electric heating appliance comprising a cup-shaped substantially non-corrodible casing, a high heat-conducting metal core within the casing, and an electric heater having a tubular metal jacket enclosing an insulated resistor and embedded in the core and projecting from the open end of the casing, the heater jacket having a higher melting point than the metal core.

11. An electric heating appliance comprising a cup-shaped high melting point substantially non-corrodible metal casing, and an electric heater having a tubular metal jacket enclosing an insulated resistor and arranged in the casing and embedded in high heat-conducting metal having a lower melting point than the heater jacket.

12. An electric heating appliance comprising a cup-shaped high melting point substantially non-corrodible metal casing, and an electric heater having a metal jacket enclosing an insulated resistor and arranged in the casing and embedded in high heat-conducting metal having a lower melting point than the heater jacket, a cap covering the open end of the casing and having the heater projecting therethrough, and terminals for the heating appliance rigidly fastened to the heater jacket.

13. An electric heating appliance having, in combination a non-corrodible, rust-resisting casing, a metal core within the casing, and an electric heater embedded in the core and provided with an insulated resistor enclosed in a metal jacket whose melting point is higher than the core metal.

14. An electric heating appliance comprising an electric heater having a metal jacket enclosing an insulated resistor, and metal cast around and about the heater jacket and surfaced with substantially non-corrodible metal, the cast metal having a lower melting point than the heater jacket and the surfacing metal.

15. An electric heating appliance comprising a cup-shaped metal casing, an electric heater having an insulated resistor arranged within an enclosing metal jacket, and metal having a lower melting point than the heater jacket and the casing, filling the casing and surrounding the electric heater.

In witness whereof, I have hereunto subscribed my name.

EDWIN N. LIGHTFOOT.